United States Patent
Dalmia et al.

(10) Patent No.: US 9,830,353 B1
(45) Date of Patent: Nov. 28, 2017

(54) DETERMINING MATCH TYPE FOR QUERY TOKENS

(71) Applicants: Aditya Dalmia, Bangalore (IN); Nipun Kwatra, Bangalore (IN); Pranav Kumar Tiwari, Bangalore (IN); Kiran S. Panesar, Sunnyvale, CA (US)

(72) Inventors: Aditya Dalmia, Bangalore (IN); Nipun Kwatra, Bangalore (IN); Pranav Kumar Tiwari, Bangalore (IN); Kiran S. Panesar, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 520 days.

(21) Appl. No.: 13/778,312

(22) Filed: Feb. 27, 2013

(51) Int. Cl.
*G06F 7/00* (2006.01)
*G06F 17/30* (2006.01)

(52) U.S. Cl.
CPC .................. *G06F 17/30442* (2013.01)

(58) Field of Classification Search
None
See application file for complete search history.

(56) References Cited

U.S. PATENT DOCUMENTS

| | | | |
|---|---|---|---|
| 7,627,550 B1 * | 12/2009 | Adams | G06F 17/30489 |
| 7,933,798 B1 | 4/2011 | Yan et al. | |
| 8,271,328 B1 | 9/2012 | Baltz et al. | |
| 2006/0020506 A1 * | 1/2006 | Axe | G06Q 30/02 |
| | | | 705/14.43 |
| 2006/0173744 A1 * | 8/2006 | Kandasamy | G06Q 30/02 |
| | | | 705/14.42 |
| 2007/0156621 A1 | 7/2007 | Wright et al. | |
| 2008/0256039 A1 * | 10/2008 | Chang | G06Q 30/02 |
| 2008/0301093 A1 * | 12/2008 | Haugen et al. | 707/3 |
| 2010/0042495 A1 * | 2/2010 | Malden et al. | 705/14.48 |
| 2010/0250361 A1 | 9/2010 | Torigoe et al. | |
| 2011/0131205 A1 * | 6/2011 | Iyer | G06F 17/30663 |
| | | | 707/728 |
| 2012/0166277 A1 | 6/2012 | Gnanamani et al. | |
| 2013/0124474 A1 * | 5/2013 | Anderson | G06F 17/30286 |
| | | | 707/634 |
| 2014/0025480 A1 * | 1/2014 | Carter | G06Q 30/0246 |
| | | | 705/14.43 |

OTHER PUBLICATIONS

Efficient Interactive Fuzzy Keyword Search; Shengyue Ji; 2009; ACM; pp. 371-380.*

* cited by examiner

*Primary Examiner* — Mariela Reyes
*Assistant Examiner* — Jermaine Mincey
(74) *Attorney, Agent, or Firm* — Fish & Richardson P.C.

(57) ABSTRACT

Example processes for determining a match type include: receiving a query token from a content provider; consulting a database stored in memory to determine past performance of the query token for associated content, where the past performance includes performance information indicating how well the query token performed for different match types, where a match type indicates a way that components of the query token match components of another query token in order to achieve a token match; determining, based on the performance information, differences in performance between ones of the different match types; comparing the differences in performance to a threshold; and selecting a match type for the query token based on the comparing.

20 Claims, 5 Drawing Sheets

DETERMINING MATCH TYPE FOR QUERY TOKENS

TECHNICAL FIELD

This disclosure relates generally to determining match type for query tokens.

BACKGROUND

The Internet provides access to a wide variety of resources. For example, video, audio, and Web pages are accessible over the Internet. These resources present opportunities for other content (e.g., advertisements, or "ads") to be provided along with the resources. For example, a Web page can include slots in which ads can be presented. The slots can be allocated to content providers (e.g., advertisers). An auction can be performed for the right to present advertising in a slot. In the auction, content providers provide bids specifying amounts that the content providers are willing to pay for presentation of their content.

Content may be selected for an auction based on a match of one or more input tokens (e.g., keywords) to tokens associated with the content. For example, an ad for sports memorabilia may be associated with the keywords "baseball", "football", and "basketball". If a user inputs one of those keywords into a search engine, the input keyword may be matched to a keyword associated with the ad, resulting in the ad being selected for auction. In some cases, there need not be an exact match between keywords that are input and keywords that are associated with content in order for that content to be selected for auction.

SUMMARY

Example processes for determining a match type include: receiving a query token from a content provider; consulting a database stored in memory to determine past performance of the query token for associated content, where the past performance includes performance information indicating how well the query token performed for different match types, where a match type indicates a way that components of the query token match components of another query token in order to achieve a token match; determining, based on the performance information, differences in performance between ones of the different match types; comparing the differences in performance to a threshold; and selecting a match type for the query token based on the comparing. The example processes may include one or more of the following features, either alone or in combination.

Selecting the match type may include selecting a match type having a difference in performance that exceeds the threshold; and in a case that more than one match type exceeds the threshold, selecting a match type among the more than one match type that provides most match options for the query token.

Selecting the match type may include determining that none of the differences in performance exceed the threshold; comparing performance information for each of the different match types to a second threshold; and selecting a match type for the query token based on the comparing to the second threshold. Selecting a match type for the query token based on the comparing to the second threshold may include: selecting a match type having performance information that exceeds the second threshold; and in a case that more than one match type exceeds the threshold, selecting a match type among the more than one match type that provides most match options for the query token.

The performance information may include at least one content metric, where the at least one content metric includes at least one of click-through rate for content associated with the query token, a cost-per-click associated with the content, and a cost-per-acquisition associated with the content.

The different match types may include at least exact match, phrase match, and broad match, where exact match requires all components of the query token to match all components of the other query token, where phrase match requires a sequence of components in the query token to match a sequence of components of the other token, and wherein broad match requires components of the query token to match components of the other token. Determining, based on the performance information, differences in performance between ones of the different match types may include determining, for the query token, a first difference between performance information for exact match and performance information for phrase match, and determining a second difference between performance information for exact match and broad match. Both the first difference and the second difference are compared to the threshold.

The token may be a keyword or phrase associated with online advertising. The selected match type may be associated with the keyword and the online advertising. The query token may be at least one of an image, audio, video, or text.

Example processes for assigning a match type may include: storing a database in memory that includes past performance of query tokens in online searching, where the past performance includes performance information indicating how well query tokens performed for different match types, where a match type indicates a way that components of a query token must match components of another query token in order to achieve a token match; receiving a query token from a content provider; and assigning a match type to the received query token based, at least in part, on one or more of past performance information, a length of the keyword, a specificity of the keyword, a number of pages containing the keyword, a number of queries containing the keyword, and a number of content items associated with keyword. The example processes may include: identifying one or more query tokens in the database that have a relationship to the received token; and retrieving, from the database, the selected past performance information for the one or more query tokens.

Two or more of the features described in this disclosure/specification, including this summary section, can be combined to form implementations not specifically described herein.

The systems and techniques described herein, or portions thereof, can be implemented as a computer program product that includes instructions that are stored on one or more non-transitory machine-readable storage media, and that are executable on one or more processing devices. The systems and techniques described herein, or portions thereof, can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF THE DRAWINGS

FIG. 1, which includes

Like reference symbols in the various drawings indicate like elements.

DETAILED DESCRIPTION

Figure 1A:
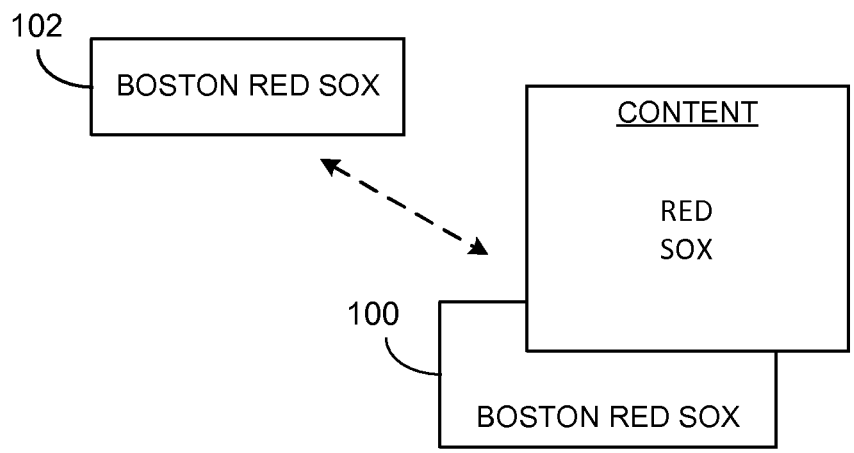
FIGS. 1A, 1B and 1C, shows examples of exact, phrase, and broad match types.

Content, such as advertising, may be provided to network users based tokens, such as keywords input by the users. For example, advertising (an "ad" or "ads") may be associated with one or more keywords that are stored as metadata along with an ad. A search engine, which operates on the network, may receive input from a user. The input may include one or more of the keywords. A content management system, which serves ads, may receive the keywords from the search engine, identify the ad as being associated with one or more of the keywords, and output the ad to the user, along with content that satisfies the initial search request. The content and the ad are displayed on a computing device. When displayed, the ad is incorporated into an appropriate slot on a results page. The user may select the ad by clicking-on the ad. In response, a hyperlink associated with the ad directs the user to another Web page. For example, if the ad is for ABC Travel Company, the Web page to which the user is directed may be the home page for ABC Travel Company. This activity is known as click-through. In this context, a "click" is not limited to a mouse click, but rather may include a touch, a programmatic selection, or any other interaction by which the ad may be selected.

A content auction is typically run to determine which content is to be output in response to an input, such as one or more keywords. In the auction, content providers may bid on specific keywords (which are associated with their content). For example, a sporting goods ad provider may associate words such as "baseball", "football" and "basketball" with their ads. The content provider may bid on those keywords in the content auction, typically on a cost-per-click (CPC) basis. That is, the content provider's bid is an amount that the provider will pay (the cost) in response to users' clicking on their displayed content. So, for example, if a content provider bids five cents per click, then the content provider pays a maximum of five cents each time their content is clicked-on by a user.

In other examples, payment need not be on a CPC basis, but rather may be on the basis of other conversions (e.g., an amount of time spent on a landing page, a purchase, and so forth).

Bidding in a content auction typically takes place against other content providers bidding for the same keywords. So, for example, if a user enters keywords into a search engine (to perform a search for related content), a content management system may select content items from different content providers, which are associated with those same keywords or variants thereof. The content auction is then run, e.g., by the content management system, to determine which content to serve along with the search results or any other requested content. Typically, the auction winner's content is presented on a results page. In this context, a page includes any display area, such as a Web page, a continuously scrollable screen, and so forth. In some examples, winners of the auction will be accorded the most preferred slot(s) on the page, while others will be accorded slots that are less preferred. In this regard, a slot on a page may include any appropriate area of the page, or any item output with the page (such as a pop-up), that is reserved for display of non-requested content, such as advertising. The most preferred slots on a results page may be a top slot on the page. Likewise, the most preferred slots on a series of pages may be the top slot of the first page.

As noted above, content is associated with keywords and, if input keywords match the keywords associated with the content, then that content may be selected for inclusion in an online content auction. What constitutes a "match" may be different under different circumstances. Some content management systems employ the concept of "match type" to indicate what needs to happen for there to be a match between query keywords (keywords input by a user) and content keywords (keywords associated with content). Some systems employ multiple match types. For example, match types may include, but are not limited to, an exact match, a phrase match, and a broad match.

In some systems, an exact match requires all components of query keywords to match all components of other query keywords; a phrase match requires a sequence of components in the query keywords to match a sequence of components in the other query keywords; and a broad match requires components of the query keywords to match components of the other query keywords. In this context, a keyword can include a single word or a phrase. Components of keywords may include letters, words, combinations of word, and so forth.

FIG. 1A shows an example of query keywords 102, here "Boston Red Sox". These query keywords may be input by a user to a search engine, a social network, a Web browser, or any other appropriate keyword entry tool. In the example of FIG. 1A, an exact match requires all components of query keywords 102 to match all components of content keywords 100. As shown in FIG. 1A, there is an exact match between "Boston Red Sox" and "Boston Red Sox". In this example, there would not be an exact match between "Boston Red Sox" and "Boston Red Socks", however, in other examples this may constitute an exact match. Likewise, there would not be an exact match between "Boston Red Sox" and "Boston Red Sox Baseball", however, in other examples this may constitute an exact match.

Figure 1B:
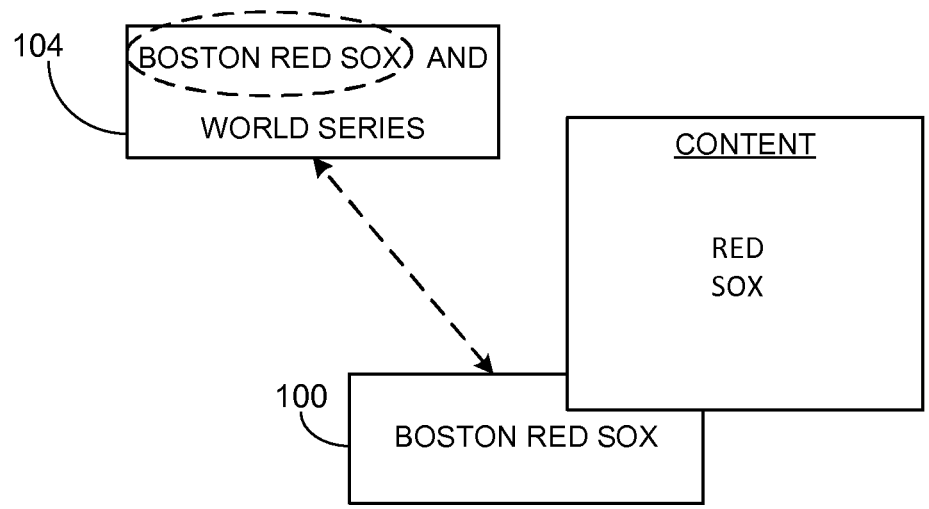

In the example of FIG. 1B, a phrase match requires all components of content keywords 100 to match an uninterrupted sequence of components of query keywords 104. As shown in FIG. 1B, there is a phrase match between content keywords "Boston Red Sox" and query keywords "Boston Red Sox and World Series". This is because the phrase "Boston Red Sox" (the content keywords) appears in an uninterrupted sequence in the query keywords "Boston Red Sox and World Series". In this example, a phrase match would not occur if the query keywords were "Red Sox and World Series" because the component word "Boston", which appears in the content keywords, is not present.

Figure 1C:
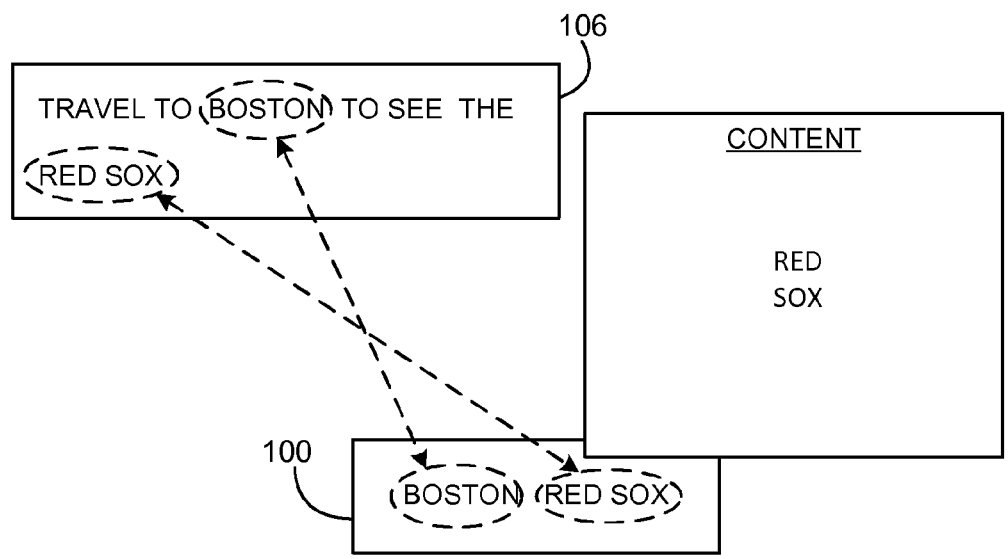

In the example of FIG. 1C, a broad match requires that components of the query keywords be included in, and match, the content keywords. Unlike a phrase match, however, in a broad match the content keywords need not be in the same sequence as the query keywords or uninterrupted. For example, in FIG. 1C, there is a broad match between content keywords "Boston Red Sox" 100 and query keywords 106 "Travel to Boston to see the Red Sox" 106 because the components "Boston", "Red" and "Sox" from the query keywords are all in the content keywords, albeit not together. The keywords need not be in the same order either. For example, there would be a broad match between content keywords "Boston Red Sox" and query keywords "Seeing the Red Sox in Boston". In some examples, however, there would not be a broad match for content keywords "Seeing the Red Sox" because "Boston" is omitted. However, this need not always be the case.

The descriptions of exact match, phrase match, and broad match may be different, and may follow different rules, in other systems. In addition, other systems may use different, more or less match types. In the example presented above, a broad match generally provides greater coverage than a phrase match, and a phrase match generally provides greater coverage than an exact match. In other words, if content is associated with keywords and the broad match type, there will likely be more matches of input query keywords for that content than for the same content with a phrase or exact match type, since there are fewer constraints as to what constitutes a broad match than there are for a phrase match and for an exact match. Similarly, if content is associated with keywords and the phrase match type, there will likely be more matches of input query keywords for that content than for the same content with an exact match type, since there are fewer constraints as to what constitutes a match than there are for the exact match type.

Increased coverage, however, can come at a cost of relevance to the input query keywords. For example, in some cases, the less precisely query keywords match content keywords, the greater the chance that content associated with the content keywords will not be relevant to the original query. For example, if the content keywords are "Detroit Tigers", an exact match or a phrase match would likely identify content relevant to the Detroit Tigers baseball team (which appears to be the most likely subject of the content). A broad match, however, may also identify the content in response to a query of "Tigers at the Detroit Zoo".

Thus, as described above, the match type of a keyword affects whether a match occurs and, therefore, whether corresponding content may be included in a content auction. The example processes described herein may be used to suggest match types for content keywords. That is, a content provider may submit content and keywords for that content. Alternatively, the content provider may submit content, and the keywords may be generated using one or more automated processes. The processes described herein may then suggest a match type to associate with the submitted content and the keywords. The suggested match type may be stored in association with the content and keywords, and defines what is required to constitute a match to the keywords. The processes described herein for suggesting match types may be used in conjunction with any type of query token, such as keywords, images, video, audio or the like. The following examples, however, focus on keywords as the tokens.

Accordingly, after receiving a keyword, a database may be consulted to determine the past performance of that keyword in association with content, such as ad(s). In this regard, the performance of content, such as an ad, may be measured in terms of network activity, such as a click through rate (CTR). In this context, a click-through includes selection of a content item that causes the user to be "clicked-through" to a Web page or other resource linked to the content. A "click" is not limited to a mouse click, but rather may include a touch, a programmatic selection, or any other interaction by which the ad may be selected.

The past performance of the keywords may be measured by the CTRs of content associated with those keywords that won an online auction, that was output, and that was clicked-on by a user. Thus, in some examples, the CTR is used as a measure of how well a match type worked. More specifically, if a match type resulted in content being included in the auction and, ultimately, clicked-on at a specified rate (e.g., if the rate exceeds a threshold), that match type is deemed successful at identifying content that was relevant to the input query keywords. By contrast, if a match type resulted in content being included in the auction and, ultimately, not clicked-on at a specified rate, that match type is deemed unsuccessful at identifying content that was relevant to the input query keywords.

Accordingly, the processes may identify successful match types for input query keywords based on information stored in the database. Identifying which match types were successful may be performed in several ways. In some implementations, a relative CTR of content may be used to determine whether a match type associated with the content was successful. Relative CTR may be used because some content, such as ads for popular online retailers, are more likely to be clicked-on than others regardless of the circumstances under which they are displayed. Using the relative CTR can reduce such effects resulting from popularity or the like, and thereby enable a more normalized comparison of CTR data.

In some examples, the "absolute CTR" is a value corresponding to the CTR of content from the database. For example, the absolute CTR may be an average CTR for the content in the database, an average CTR over a time period, a weighted average CTR, and so forth. In some examples, a relative CTR may be a difference, for a particular keyword, in performance between ones of the different match types. For example, a difference in performance between ones of the different match types may include, for a keyword, a difference between CTR information for exact match and for phrase match and/or a difference between CTR information for exact match and broad match. Since the performance of the same keyword for the same content is being considered, effects resulting from popularity can be reduced. The CTR information used in determining the relative CTR may be, e.g., an average CTR for the content in the database, an average CTR over a time period, a weighted average CTR, and so forth In some implementations, the relative CTRs associated with a keyword are compared to a threshold. If the relative CTR exceeds the threshold, then the corresponding match type is a candidate for selection. As noted above, in some implementations, there will be two relative CTRs, e.g., a first difference between CTR information for exact match and CTR information for phrase match and a second difference between CTR information for exact match and CTR information broad match. Accordingly, there will be two relative CTRs determined. If only one of those relative CTRs is above the threshold, then the corresponding match type is selected for the keywords. For example, if the first difference above is above the threshold, but the second difference is not, then the phrase match type is selected. If both of those relative CTRs are above the threshold, then the match type that provides the broader coverage is selected for the keywords, namely the broad match type in this example. If neither of the relative CTRs is above the threshold, then the exact match type may be selected for the keyword.

In some cases, there may not be sufficient information to determine relative CTRs. For example, if there is CTR information for an exact match of keywords and a phrase match of keywords, but not for a broad match, then these "absolute" CTRs maybe compared to a threshold. The match type whose CTR exceeds the threshold is selected. If the CTRs of both match types exceed the threshold, then the match type that provides most coverage is selected.

The selected match type is stored in association with the corresponding keywords and online content (e.g., query/ad pairs). For example, a content management system may store the selected match type, keywords, and online content in a database. The database may be accessed, and used, in order to identify whether input keywords match keywords associated with content. If a match is determined according to keywords' associated match type, the content is included in an online auction, which is run to determine which content will be output.

In the example processes described herein, keywords are used as the query input, also referred to as "tokens", and are associated with, and matched to, content items. However, other types of information may be used for the query and association. For example, query tokens may include, alone or in combination, images, audio, video, or the like, either alone or in combination with keywords. This input may match corresponding information associated with corresponding content. Matching may be based on the match types suggested herein.

The example process described herein can be implemented in any appropriate network environment, with any appropriate devices and computing equipment. An example of such an environment is described below.

Figure 2:
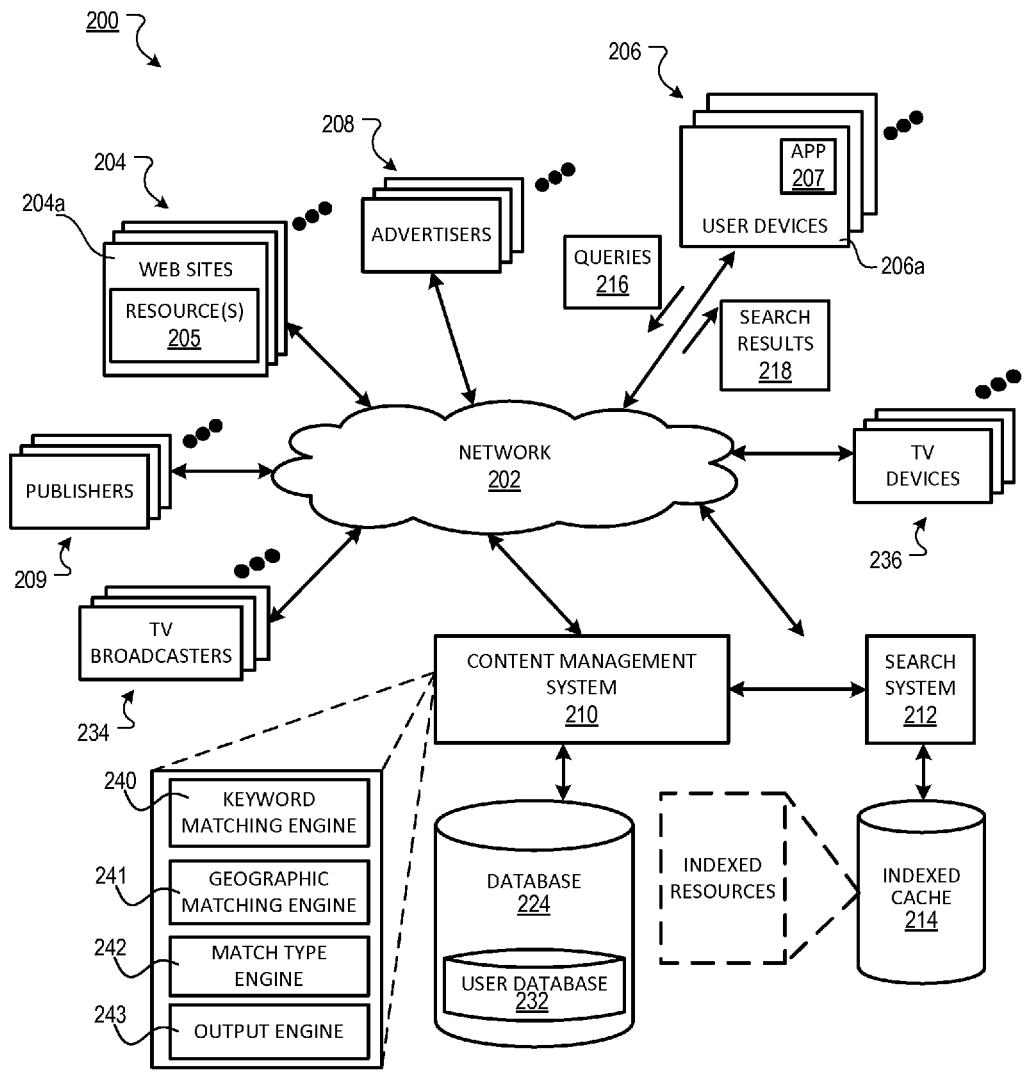
FIG. 2 is a block diagram of an example network environment on which the example processes described herein can be implemented.

FIG. 2 is a block diagram of an example environment 200 for providing content to a user of a user device in accordance with the example processes described herein. The example environment 200 includes a network 202.

Network 202 can represent a communications network that can allow devices, such as a user device 206a, to communicate with entities on the network through a communication interface (not shown), which can include digital signal processing circuitry. Network 202 can include one or more networks. The network(s) can provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication can occur through a radio-frequency transceiver. In addition, short-range communication can occur, such as using a Bluetooth, WiFi, or other such transceiver.

Network 202 connects various entities, such as Web sites 204, user devices 206, content providers (e.g., advertisers 208), online publishers 209, and a content management system 210. In this regard, example environment 200 can include many thousands of Web sites 204, user devices 206, and content providers (e.g., advertisers 208). Entities connected to network 202 include and/or connect through one or more servers. Each such server can be one or more of various forms of servers, such as a Web server, an application server, a proxy server, a network server, or a server farm. Each server can include one or more processing devices, memory, and a storage system.

In FIG. 2, Web sites 204 can include one or more resources 205 associated with a domain name and hosted by one or more servers. An example Web site 204a is a collection of Web pages formatted in hypertext markup language (HTML) that can contain text, images, multimedia content, and programming elements, such as scripts. Each Web site 204 can be maintained by a publisher 209, which is an entity that controls, manages and/or owns the Web site 204.

A resource 205 can be any appropriate data that can be provided over network 202. A resource 205 can be identified by a resource address that is associated with the resource 205. Resources 205 can include HTML pages, word processing documents, portable document format (PDF) documents, images, video, and news feed sources, to name a few. Resources 205 can include content, such as words, phrases, images and sounds, that can include embedded information (such as meta-information hyperlinks) and/or embedded instructions (such as JavaScript scripts).

To facilitate searching of resources 205, environment 200 can include a search system 212 that identifies the resources 205 by crawling and indexing the resources 205 provided by the content publishers on the Web sites 204. Data about the resources 205 can be indexed based on the resource 205 to which the data corresponds. The indexed and, optionally, cached copies of the resources 205 can be stored in an indexed cache 214.

An example user device 206a is an electronic device that is under control of a user and that is capable of requesting and receiving resources over the network 202. A user device can include one or more processing devices, and can be, or include, a mobile telephone (e.g., a smartphone), a laptop computer, a handheld computer, an interactive or so-called "smart" television or set-top box, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the user device can be included as part of a motor vehicle (e.g., an automobile, an emergency vehicle (e.g., fire truck, ambulance), a bus).

User device 206a typically stores one or more user applications, such as a Web browser, to facilitate the sending and receiving of data over the network 202. A user device 206a that is mobile (or simply, "mobile device"), such as a smartphone or a table computer, can include an application ("app") 207 that allows the user to conduct a network (e.g., Web) search. User devices 206 can also be equipped with software to communicate with a GPS system, thereby enabling the GPS system to locate the mobile device.

User device 206a can request resources 205 from a Web site 204a. In turn, data representing the resource 205 can be provided to the user device 206a for presentation by the user device 206a. User devices 206 can also submit search queries 216 to the search system 212 over the network 202. A request for a resource 205 or a search query 216 sent from a user device 206 can include an identifier, such as a cookie, identifying the user of the user device.

In response to a search query 216, the search system 212 can access the indexed cache 214 to identify resources 205 that are relevant to the search query 216. The search system 212 identifies the resources 205 in the form of search results 218 and returns the search results 218 to a user device 206 in search results pages. A search result 218 can include data generated by the search system 212 that identifies a resource 205 that is responsive to a particular search query 216, and includes a link to the resource 205. An example search result 218 can include a Web page title, a snippet of text or a portion of an image obtained from the Web page, and the URL (Unified Resource Location) of the Web page.

Content management system 210 can be used for selecting and providing content in response to requests for content. Content management system 210 also can, with appropriate user permission, update database 224 based on activity of a user. The user may enable and/or disable the storing of such information. In this regard, with appropriate user permission, the database 224 can store a profile for the user which includes, for example, information about past user activities, such as visits to a place or event, past requests for resources 205, past search queries 216, other requests for content, Web sites visited, or interactions with content. User interests may also be stored in the profile and, in some examples, may be determined from the information about past user activities. In some implementations, the information in database 224 can be derived, for example, from one or more of a query log, an advertisement log, or requests for content. The database 224 can include, for each entry, a cookie identifying the user, a timestamp, an IP (Internet Protocol) address associated with a requesting user device 206, a type of usage, and details associated with the usage.

Content management system 210 may include a keyword matching engine 240 to compare query keywords to content keywords and to generate a keyword matching score indicative of how well the query keywords match the content keywords. In an example, the keyword matching score is equal, or proportional, to a sum of a number of matches of words in the input query to words associated with the content. Content management system 210 may include a geographic (or "geo-") matching engine 241 to compare geographic information (e.g., numerical values for place names) obtained from words in input queries to geographic information associated with content.

When a resource 205 or search results 218 are requested by a user device 206, content management system 210 can receive a request for content to be provided with the resource 205 or search results 218. The request for content can include characteristics of one or more "slots" that are defined for the requested resource 205 or search results page. For example, the data representing the resource 205 can include data specifying a portion of the resource 205 or a portion of a user display, such as a presentation location of a pop-up window or a slot of a third-party content site or Web page, in which content can be presented. An example slot is an ad slot. Search results pages can also include one or more slots in which other content items (e.g., ads) can be presented.

Information about slots can be provided to content management system 210. For example, a reference (e.g., URL) to the resource for which the slot is defined, a size of the slot, and/or media types that are available for presentation in the slot can be provided to the content management system 210. Similarly, keywords associated with a requested resource or a search query 216 for which search results are requested can also be provided to the content management system 210 to facilitate identification of content that is relevant to the resource or search query 216.

Based at least in part on data generated from and/or included in the request, content management system 210 can select content that is eligible to be provided in response to the request ("eligible content items"). For example, eligible content items can include eligible ads having characteristics matching keywords and/or geographic information associated with corresponding content. In some implementations, the universe of eligible content items (e.g., ads) can be narrowed by taking into account other factors, such as previous search queries 216. For example, content items corresponding to historical search activities of the user including, e.g., search keywords used, particular content interacted with, sites visited by the user, etc. can also be used in the selection of eligible content items by the content management system 210.

Content management system 210 can select the eligible content items that are to be provided for presentation in slots of a resource 205 or search results page 218 based, at least in part, on results of an auction, such as a second price auction. For example, for eligible content items, content management system 210 can receive bids from content providers (e.g., advertisers 208) and allocate slots, based at least in part on the received bids (e.g., based on the highest bidders at the conclusion of the auction). The bids are amounts that the content providers are willing to pay for presentation (or selection) of their content with a resource 205 or search results page 218. For example, a bid for keywords can specify an amount that a content provider is willing to pay for each 1000 impressions (i.e., presentations) of the content item, referred to as a CPM bid. Alternatively, the bid for keywords can specify an amount that the content provider is willing to pay for a selection (i.e., a click-through) of the content item or a conversion following selection of the content item. This is referred to as cost-per-click (CPC). The selected content item can be determined based on the bids alone, or based on the bids of each bidder being multiplied by one or more factors, such as quality scores derived from content performance, landing page scores, and/or other factors.

In some implementations, a content provider can bid for an audience of users. For example, one or more of the publishers 209 and/or the content management system 210 can identify one or more audiences of users, where each user in the audience matches one or more criteria, such as matching one or more demographics. An audience of users can be represented, for example, as a user list. User lists or other representations of audiences can be stored, for example, in a user database 232. A bid from a content provider can specify, for example, an amount that the content provider is willing to pay for each 1000 impressions (i.e., presentations) of the content item to a particular audience of users. The content management system 210 can, for example, manage the presentation of the content item to users included in a particular audience and can manage charging of the content provider for the impressions and distributing revenue to the publishers 209 based on the impressions.

In some implementations, TV (Television) broadcasters 234 produce and present television content on TV user devices 236, where the television content can be organized into one or more channels. The TV broadcasters 234 can include, along with the television content, one or more content slots in which other content (e.g., advertisements) can be presented. For example, a TV network can sell slots of advertising to advertisers in television programs that they broadcast. Some or all of the content slots can be described in terms of user audiences which represent typical users who watch content with which a respective content slot is associated. Content providers can bid, in an auction (as described above), on a content slot that is associated with keywords for particular television content.

Content management system 210 may include a match type engine 242. Match type engine 242 may implement all or part of the example processes described herein for determining a match type. Content selected for output through an online content auction may be distributed by content distribution engine 243, which is also part of the content management system.

Figure 3:
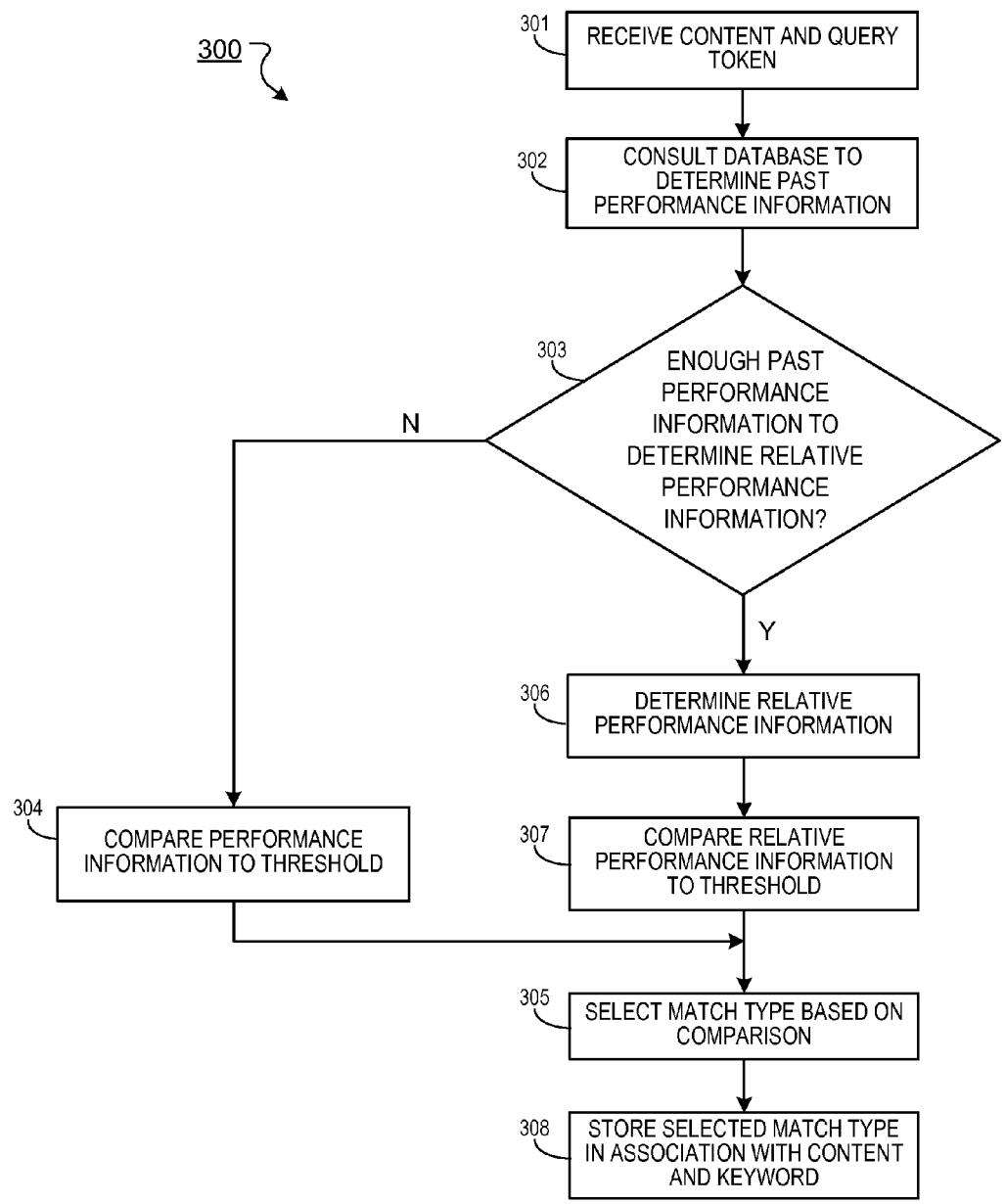
FIG. 3 is a flowchart showing an example process for suggesting a match type for input query tokens.

FIG. 3 is a flowchart showing an example process 300 that may be performed by content management system 210 including, at least partly, by match type engine 242 for generating match types for query tokens (e.g., keywords). Process 300 is described in the context of online advertising using keywords as query tokens; however, it is applicable to any type of online content and query tokens.

According to process 300, information is received (301) from a content provider. In this example, the information includes content to be served and keywords associated with that content (although other types of query tokens may be received and used). For example, content management system 210 may provide an online portal (not shown), through which an advertiser may enter information about an ad campaign. The information may include, among other things, an ad creative, keywords associated with the ad, geographic information, and other information that is usable to distribute the ad along with other content that has been requested, such as search results pages or Web pages. In other implementations, the content provider need not provide the keywords. Rather, the keywords may be determined based on prior keyword usage through one or more automated processes.

A database is consulted (302) to determine past performance of an input keyword associated with the ad. This process may be performed for each keyword received. In the context of this disclosure, a group of words, such as "Boston Red Sox" may also be considered to be a "keyword". The database may include one or more search logs that have been indexed for searching. In some examples, the past performance may include performance information indicating how well the keyword performed for different match types. As described above, match type indicates a way that components of the query token match components of another query token in order to achieve a token match.

As describe above, the performance of content, such as an ad, may be measured in terms of network activity, such as a click through rate (CTR). In the examples processes described herein, the past performance of the keywords may be measured by the CTRs of content containing keywords that won an online auction, that was output, and that was clicked. Thus, the CTR is used as a measure of how well the corresponding match type worked. More specifically, if a match type resulted in content being included in the auction and, ultimately, clicked-on at a specified rate (e.g., if the rate exceeds a threshold), that match type is deemed successful at identifying content that was relevant to the input query keywords. By contrast, if a match type resulted in content being included in the auction and, ultimately, not clicked-on at a specified rate, that match type is deemed unsuccessful at identifying content that was relevant to the input query keywords.

In some implementations, the past performance information may include information instead of, or in addition to, CTR. For example, the past performance information may include, but is not limited to, the number of impressions served, the number of conversions made, the CPC associated with the keywords, a cost-per-acquisition (CPA) associated with the keywords, either alone or in some combination with CTR. In this regard, a target CPA is the average amount an advertiser would like to pay for a conversion. In some processes, this type of past performance information may be used as a measure of how well a match type worked. However, in the example processes described herein, CTR is used. Furthermore, in some example processes, only content displayed in particular slots is considered. For example, in some examples, only content in a top (or most prominent) page slot is considered in identifying past performance.

Accordingly, the database is consulted (302) to identify past performance information (e.g., CTRs) for content that is associated with the input keyword ("Boston Red Sox"). As noted, in some examples, there are three match types: exact match, phrase match, and broad match. The past performance information may be determined for each of these three match types.

It is next determined (303) whether there is enough past performance information for the keyword to determine relative performance information. More specifically, as explained above, some content is, for a variety of reasons, more likely to be selected than other content, resulting in a higher CTR for that content. To reduce these effects, relative CTR values may be used, instead of absolute CTR values, in the processes described herein for determining a keyword match type. In some examples, relative CTR values are determined based on differences in past CTRs for different match types for the same keyword. As explained above, in some examples, relative CTRs for a keyword may be a difference between past CTRs for exact match and past CTRs for phrase match and a difference between past CTRs for exact match and past CTRs broad match. As explained above, the past CTRs may be averaged or CTRs from the database that may be otherwise aggregated.

In some cases, there may not be enough past performance (e.g., CTR) information in the database to determine relative CTRs for a given keyword. For example, the amount of CTR information in the database for a particular match type may not exceed a threshold that defines the minimum amount of information needed to determine relative CTRs. In that case, absolute CTRs from the database may be used to determine which match type to select. As explained above, in some examples, the absolute CTR for a match type is the average of all CTRs in the database for that keyword and match type. In other examples, the absolute CTRs may be determined by averaging CTRs over a period of time (e.g., the last day, week, month, etc.), by weighting the average higher for similar content, by averaging content from the same or similar provider, by using only content that is the same as the input content, and so forth. Various other methods may be used to determine the absolute CTRs used by process 300.

If there is not be enough past performance information to determine relative CTRs for a keyword, the absolute CTRs for the keywords are used to determine a match type. For example, the absolute CTRs for exact match, phrase match, and broad match may be compared (304) to a threshold. The threshold may be a percentile, e.g., above the $70^{th}$ percentile, of a corpus of absolute CTR values in the database. If one absolute CTR for a particular match type exceeds the threshold, then the corresponding match type is selected (305) for the keyword. If, however, more than one absolute CTR for a match type exceeds the threshold, then then the corresponding match types are deemed to be candidates for selection. In this case, among the candidates, the match type that provides the most coverage is selected for association with the keyword. For example, the broad match type would be selected over the phrase or exact match types because the broad match type provides greater coverage. Likewise, the phrase match type would be selected over the exact match type because the phrase match type provides greater coverage than the exact match type.

Referring back to operation 303, if there is enough past performance information to determine relative CTRs for a keyword, then the relative CTRs (e.g., performance information) (306) are determined. As explained above, in some examples, the relative CTRs may include a difference between performance information (e.g., CTRs) for exact match and performance information (e.g., CTRs) for phrase match and a difference between performance information (e.g., CTRs) for exact match and performance information (e.g., CTRs) broad match. In some examples, the relative CTRs for a keyword are compared (307) to a threshold. In some examples, the median relative CTR for a corpus in the database is used as the threshold (e.g., the $50^{th}$ percentile). The corpus may be, e.g., an entire database of information about CTRs or a portion of that database, e.g., relating to specific users, content, time periods, and so forth.

As noted above, if a relative CTR exceeds the threshold, then the corresponding match type is a candidate for selection. In some implementations, there will be multiple relative CTRs, e.g., a difference between CTRs for exact match and phrase match and a difference between CTRs for exact match and broad match. Accordingly, in this case, there will be two relative CTRs determined. If only one of those relative CTRs is above the threshold, then the corresponding match type is selected (305) for the keywords. For example, if the first difference above is over the threshold, but the second difference is not, then the phrase match type is selected. If both of those relative CTRs are above the threshold, then the match type that provides the broader coverage is selected for the keywords, namely the broad match type in the above example. If neither of the relative CTRs is above the threshold, then the exact match type is selected for the keyword.

The selected match type is stored (308) in a database, e.g., in content management system 210, in association with corresponding content and keywords.

The match type and keywords may be used by the content management system to select content, such as ads, to output along with requested content. For example, the content management system may receive keywords, such as "Boston Red Sox and Fenway Park" from a search engine or other input portal. These keywords may be matched, using a stored match type, to keywords associated with content. For example, the content may be advertising for Fenway Park, and the keywords associated with the advertising may be "Boston Red Sox". In this case, if the match type is exact, there will not be a match to "Boston Red Sox" because of the inclusion of "and Fenway Park" in the query keywords. However, if the match type is phrase or broad, there will be a match, and the corresponding advertising content will be selected for inclusion in an online content auction that determines which content will ultimately be output.

The auction is run against competitors of the advertiser who provided the Fenway Park ad, which are also bidding for keywords that will result in display of their content in response to user input. The auction may be run by content management system 210, as explained above. A winner of the auction is determined, and that winner's content is output.

In an alternative implementation, training data is generated, as described above, using past performance of keywords in each match type to identify a best match type suggestion. The training data may include, but is not limited to the following: CTRs, impressions, conversions, keywords, content and their corresponding match type suggestions, and so forth. These suggestions may be used directly, as described above, and as training data for a classifier that suggests match types for received keywords. More specifically, after there is more than a threshold amount of training data, that data can be used to build a classifier. The classifier may be part of match type engine 242 of the system shown in FIG. 2. In some examples, for a given keyword, the classifier is programmed to suggest a best match type for input keywords.

Examples of features that may be used for the classifier to suggest match types are those identifying how specific/broad a keyword is relative to other keywords. For example, a less specific keyword (e.g., "hotel") may not be a good phrase/broad match candidate since the intent of a matching query can be very different and not same as the advertiser intent. For example, an input query of "hotel" may yield "hotels San Francisco", "hotels San Diego", "hotel management", "hotel construction", and so forth. On the other hand, for a specific keyword (e.g. "hotels San Francisco"), it may be difficult to deviate from the original meaning. Consequently, more specific keywords may be good candidates for phrase/broad match, which help to increase coverage without significant loss in quality of the matches (e.g., "cheap hotels in San Francisco", "best hotels San Francisco, and so forth). Thus, the classifier may make its match type suggested based, at least in part, on features identifying a keyword's specificity, such as an inverse document frequency (IDF) of keyword segments, a number of phrase/broad matches for the keyword in a query stream, and so forth. In this regard, the IDF is a measurement of how rare a word is in a particular corpus.

Figure 4:
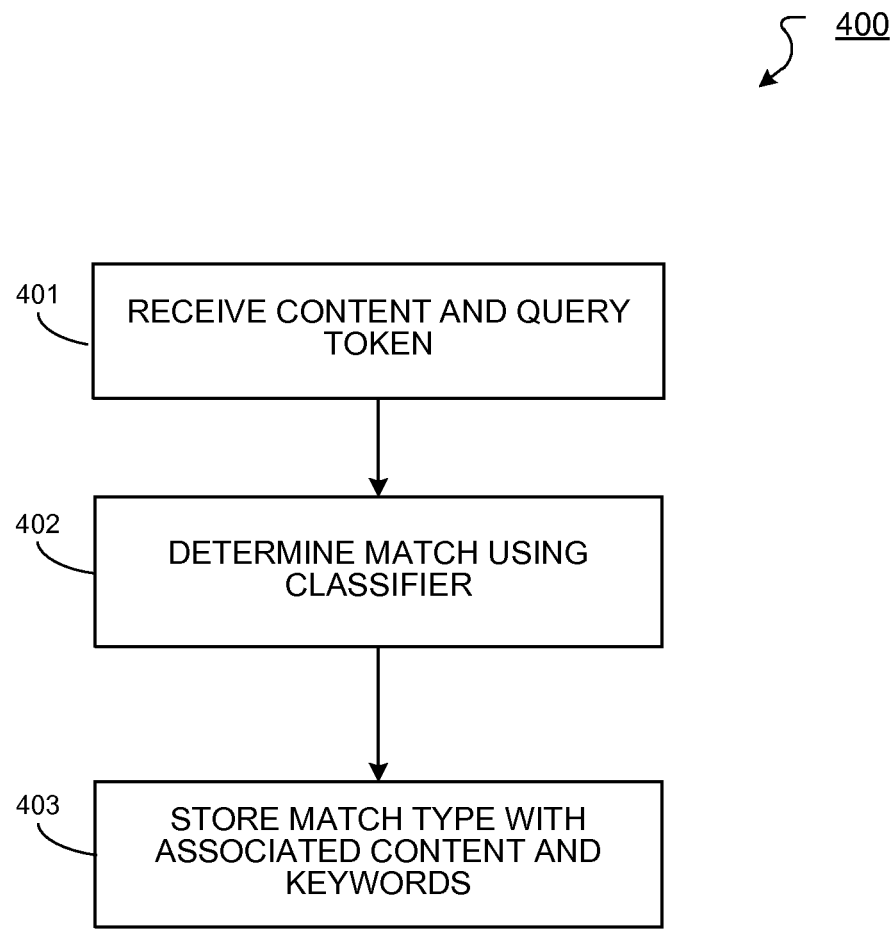
FIG. 4 is a flowchart showing an example process for suggesting a match type using a match type classifier.

Referring to FIG. 4, according to process 400, information is received (401) from a content provider. In this example, the information includes content to be served and keywords associated with that content (although other types of query tokens may be received and used). As above, content management system 210 may provide an online portal (not shown), through which an advertiser may enter information about an ad campaign. The information may include, among other things, an ad creative, keywords associated with the ad, geographic information, and other information that is usable to distribute the ad along with other content that has been requested, such as search results pages or Web pages.

The classifier determines (402) a suggested match type for the input keywords (or other query tokens, such as images, audio, video, and so forth). The classifier may use information such as the length of the keywords, their specificity, and so forth to suggest a match type. As indicated above, the longer or more specific keywords are, the better candidates those keywords are for phrase match or broad match. In this regard, the classifier may use thresholds to determine which keywords to assign the exact match type, which keywords to assign phrase match types, and which keywords to assign broad match types. The thresholds may be based on a combination of keyword length, specificity, IDF, and/or one or more other features. If the keyword is below the first threshold, it may be assigned an exact match type; if the keyword is between the first threshold and a second threshold, it may be assigned a phrase match type; and if the keyword is above the second threshold, it may be assigned the broad match type. In other examples, the classifier may use the training data differently in assigning match types.

In addition to, or instead of, the length of the keywords and their specificity, the classifier may use other information to suggest a match type. For example, the classifier may use the number of pages containing a keyword to suggest a match type, the number of queries containing a keyword to suggest a match type, and/or the number of other items associated with a keyword to suggest a match type. In some implementations, the more items that contain one or more keywords, the better candidate those keywords are for exact match. Conversely, in some implementations, fewer items that contain one or more keywords, the better candidate those keywords are for phrase match broad match. Thresholds may be used to determine the type of match to be assigned to the keywords.

The assigned match type is stored (403) in a database (e.g., in content management system 210) in association with corresponding content and keywords. The stored match type(s) may be used as described herein.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Content, such as ads, generated according to the processes described herein may be displayed on a computer peripheral (e.g., a monitor) associated with a computer. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein can be combined to form other implementations not specifically set forth above. Elements can be left out of the processes, computer programs, Web pages, etc. described herein without adversely affecting their operation. In addition, the logic flows depicted in the figures do not require the particular order shown, or sequential order, to achieve desirable results. Various separate elements can be combined into one or more individual elements to perform the functions described herein.

Other implementations not specifically described herein are also within the scope of the following claims.

What is claimed is:

1. A method performed by one or more processing devices, comprising:
   receiving, from a content provider, a query token that controls distribution of content provided by the content provider;
   consulting a database stored in memory to determine past performance of the query token when used to distribute content, the past performance comprising performance information indicating how well the query token performed for different match types, where a match type defines what is required to constitute a token match between components of the query token and components of a search query that is submitted by a user;
   identifying, by the one or more processing devices, a specificity value of the query token that quantifies how specific the query token is based on how rare the query token is in a particular corpus of words;

determining, by the one or more processing devices and based on the performance information, differences in performance of the query token between the different match types;

determining that the differences in performance meet a threshold difference in performance;

in response to the determination that the differences in performance meet the threshold difference in performance, comparing the identified specificity value of the query token that quantifies how specific the query token is to a threshold specificity;

selecting, based on the comparing, a match type for the query token, the selecting including:

selecting an exact match type for the query token when the specificity of the query token is less than the threshold specificity, wherein selection of the exact match type requires all components of a user submitted query to match the query token for the content to be eligible for distribution; and selecting a phrase match type or broad match type for the query token when the specificity of the query token is greater than the threshold specificity, wherein each of the phrase match type and the broad match type require less of a match than the exact match type;

assigning, by the one or more processing devices, the match type to the query token, where assigning comprises storing the match type in association with the query token and content associated with the query token; and comparing the query token to received input of a search query from a user different from the content provider in accordance with the match type to identify the content for output to a display device.

2. The method of claim 1, wherein selecting the match type comprises:

selecting a match type having a difference in performance that exceeds the threshold difference in performance; and in a case that more than one match type exceeds the threshold difference in performance, selecting a match type among the more than one match type that provides most match options for the query token.

3. The method of claim 1, wherein selecting the match type comprises:

determining that none of the differences in performance exceed the threshold difference in performance;

comparing performance information for each of the different match types to a second threshold difference in performance different from the threshold difference in performance; and selecting a match type for the query token based on the comparing to the second threshold difference in performance.

4. The method of claim 3, wherein selecting a match type for the query token based on the comparing to the second threshold difference in performance comprises:

selecting a match type having performance information that exceeds the second threshold difference in performance; and in a case that more than one match type exceeds the threshold difference in performance, selecting a match type among the more than one match type that provides most match options for the query token.

5. The method of claim 1, wherein the performance information comprises at least one content metric, the at least one content metric comprising at least one of click-through rate for content associated with the query token, a cost-per-click associated with the content, or a cost-per-acquisition associated with the content.

6. The method of claim 1, wherein the different match types comprise at least exact match, phrase match, and broad match, where phrase match requires a sequence of components in the query token to match a sequence of components of the other token, and where broad match requires components of the query token to match components of the other token;

wherein determining, based on the performance information, differences in performance between ones of the different match types comprises determining, for the query token, a first difference between performance information for exact match and performance information for phrase match, and determining a second difference between performance information for exact match and broad match; and wherein both the first difference and the second difference are compared to the threshold difference in performance.

7. The method of claim 1, wherein the query token comprises a keyword or phrase associated with online advertising, the selected match type being associated with the keyword and the online advertising.

8. The method of claim 1, wherein the query token comprises at least one of an image, audio, video, or text.

9. A method performed by one or more processing devices, comprising:

storing a database in memory comprising past performance of query tokens when used to distribute content provided in response to online searching, the past performance comprising performance information indicating how well query tokens performed for different match types, where a match type defines what is required to constitute a token match between components of the query token and components of a search query that is submitted by a user;

receiving, from a content provider, a query token that controls distribution of content provided by the content provider;

identifying, by the one or more processing devices, a specificity value of the query token that quantifies how specific the query token is based on how rare the query token is in a particular corpus of words;

determining, by the one or more processing devices and based on the performance information, differences in performance of the query token between the different match types;

determining that the differences in performance meet a threshold difference in performance;

assigning, by the one or more processing devices, a match type to the received query token in response to the determination that the differences in performance meet the threshold difference in performance, and comparing a specificity of the query token to a threshold specificity, where assigning comprises storing the match type in association with the query token and content associated with the query token, and where assignment of an exact match type requires all components of a user submitted query to match the query token for the content to be eligible for distribution, wherein assignment of each of a phrase match type and a broad match type require less of a match than the exact match type; and comparing the query token to received input of a search query from a user different from the content provider in accordance with the match type to identify the content for output to a display device.

10. The method of claim 9, further comprising:
identifying one or more query tokens in the database that have a relationship to the received token; and
retrieving, from the database, the selected past performance information for the one or more query tokens.

11. One or more machine-readable storage devices storing instructions that are executable by one or more processing devices to perform operations comprising:
receiving, from a content provider, a query token that control distribution of content provided by the content provider;
consulting a database stored in memory to determine past performance of the query token when used to distribute content, the past performance comprising performance information indicating how well the query token performed for different match types, where a match type defines what is required to constitute a token match between components of the query token and components of a search query that is submitted by a user;
identifying a specificity value of the query token that quantifies how specific the query token is based on how rare the query token is in a particular corpus of words;
determining, based on the performance information, differences in performance of the query token between the different match types;
determining that the differences in performance meet a threshold difference in performance;
in response to the determination that the differences in performance meet the threshold difference in performance, comparing the identified specificity value of the query token that quantifies how specific the query token is to a threshold specificity;
selecting, based on the comparing, a match type for the query token, the selecting including:
selecting an exact match type for the query token when the specificity of the query token is less than the threshold specificity, wherein selection of the exact match type requires all components of a user submitted query to match the query token for the content to be eligible for distribution; and
selecting a phrase match type or broad match type for the query token when the specificity of the query token is greater than the threshold specificity, wherein each of the phrase match type and the broad match type require less of a match than the exact match type;
assigning the match type to the query token, where assigning comprises storing the match type in association with the query token and content associated with the query token; and
comparing the query token to received input of a search query from a user different from the content provider in accordance with the match type to identify the content for output to a display device.

12. A system comprising:
memory storing instructions that are executable; and
one or more processing devices to execute the instructions to implement a content management system, the content management system for performing operations comprising:
receiving, from a content provider, a query token that controls distribution of content provided by the content provider;
consulting a database stored in memory to determine past performance of the query token when used to distribute content, the past performance comprising performance information indicating how well the query token performed for different match types, where a match type defines what is required to constitute a token match between components of the query token and components of a search query that is submitted by a user;
identifying a specificity value of the query token that quantifies how specific the query token is based on how rare the query token is in a particular corpus of words;
determining, based on the performance information, differences in performance of the query token between the different match types;
determining that the differences in performance meet a threshold difference in performance;
in response to the determination that the differences in performance meet the threshold difference in performance, comparing the identified specificity value of the query token that quantifies how specific the query token is to a threshold specificity;
selecting, based on the comparing, a match type for the query token, the selecting including:
selecting an exact match type for the query token when the specificity of the query token is less than the threshold specificity, wherein selection of the exact match type requires all components of a user submitted query to match the query token for the content to be eligible for distribution; and
selecting a phrase match type or broad match type for the query token when the specificity of the query token is greater than the threshold specificity, wherein each of the phrase match type and the broad match type require less of a match than the exact match type;
assigning the match type to the query token, where assigning comprises storing the match type in association with the query token and content associated with the query token; and
comparing the query token to received input of a search query from a user different from the content provider in accordance with the match type to identify the content for output to a display device.

13. One or more machine-readable storage devices storing instructions that are executable by one or more processing devices to perform operations comprising:
storing a database in memory comprising past performance of query tokens when used to distribute content provided in response to online searching, the past performance comprising performance information indicating how well query tokens performed for different match types, where a match type defines what is required to constitute a token match between components of the query token and components of a search query that is submitted by a user;
receiving, from a content provider, a query token that controls distribution of content provided by the content provider;
identifying, by the one or more processing devices, a specificity value of the query token that quantifies how specific the query token is based on how rare the query token is in a particular corpus of words;
determining, by the one or more processing devices and based on the performance information, differences in performance of the query token between the different match types;

determining that the differences in performance meet a threshold difference in performance;

assigning, by the one or more processing devices, a match type to the received query token in response to the determination that the differences in performance meet the threshold difference in performance, and comparing a specificity of the query token to a threshold specificity, where assigning comprises storing the match type in association with the query token and content associated with the query token, and where assignment of an exact match type requires all components of a user submitted query to match the query token for the content to be eligible for distribution, wherein assignment of each of a phrase match type and a broad match type require less of a match than the exact match type; and comparing the query token to received input of a search query from a user different from the content provider in accordance with the match type to identify the content for output to a display device.

14. A system comprising:

memory storing instructions that are executable; and one or more processing devices to execute the instructions to implement a content management system, the content management system for performing operations comprising:

storing a database in memory comprising past performance of query tokens when used to distribute content provided in response to online searching, the past performance comprising performance information indicating how well query tokens performed for different match types, where a match type defines what is required to constitute a token match between components of the query token and components of a search query that is submitted by a user;

receiving, from a content provider, a query token that controls distribution of content provided by the content provider;

identifying, by the one or more processing devices, a specificity value of the query token that quantifies how specific the query token is based on how rare the query token is in a particular corpus of words;

determining, by the one or more processing devices and based on the performance information, differences in performance of the query token between the different match types;

determining that the differences in performance meet a threshold difference in performance;

assigning a match type to the received query token in response to the determination that the differences in performance meet the threshold difference in performance, and comparing a specificity of the query token to a threshold specificity, where assigning comprises storing the match type in association with the query token and content associated with the query token, and where assignment of an exact match type requires all components of a user submitted query to match the query token for the content to be eligible for distribution, wherein assignment of each of a phrase match type and a broad match type require less of a match than the exact match type; and comparing the query token to received input of a search query from a user different from the content provider in accordance with the match type to identify the content for output to a display device.

15. The one or more machine-readable storage devices of claim 11, wherein the performance information comprises at least one content metric, the at least one content metric comprising at least one of click-through rate for content associated with the query token, a cost-per-click associated with the content, or a cost-per-acquisition associated with the content.

16. The one or more machine-readable storage devices of claim 11, wherein the different match types comprise at least exact match, phrase match, and broad match, where phrase match requires a sequence of components in the query token to match a sequence of components of the other token, and where broad match requires components of the query token to match components of the other token;

wherein determining, based on the performance information, differences in performance between ones of the different match types comprises determining, for the query token, a first difference between performance information for exact match and performance information for phrase match, and determining a second difference between performance information for exact match and broad match; and wherein both the first difference and the second difference are compared to the threshold difference in performance.

17. The one or more machine-readable storage devices of claim 11, wherein the query token comprises a keyword or phrase associated with online advertising, the selected match type being associated with the keyword and the online advertising.

18. The system of claim 12, wherein the performance information comprises at least one content metric, the at least one content metric comprising at least one of click-through rate for content associated with the query token, a cost-per-click associated with the content, or a cost-per-acquisition associated with the content.

19. The system of claim 12, wherein the different match types comprise at least exact match, phrase match, and broad match, where phrase match requires a sequence of components in the query token to match a sequence of components of the other token, and where broad match requires components of the query token to match components of the other token;

wherein determining, based on the performance information, differences in performance between ones of the different match types comprises determining, for the query token, a first difference between performance information for exact match and performance information for phrase match, and determining a second difference between performance information for exact match and broad match; and wherein both the first difference and the second difference are compared to the threshold difference in performance.

20. The system of claim 12, wherein the query token comprises a keyword or phrase associated with online advertising, the selected match type being associated with the keyword and the online advertising.

* * * * *